United States Patent [19]

Shiratori et al.

[11] Patent Number: 4,598,986
[45] Date of Patent: Jul. 8, 1986

[54] APPARATUS FOR EXPOSURE CORRECTION

[75] Inventors: Kazutoshi Shiratori, Hachioji; Takashi Kodama, Hino; Mitsuo Kawazoe, Hachioji; Tetsuo Miyasaka, Hachioji; Masaki Nagao, Hachioji, all of Japan

[73] Assignee: Olympus Optical Co., Ltd., Tokyo, Japan

[21] Appl. No.: 772,360

[22] Filed: Sep. 4, 1985

Related U.S. Application Data

[63] Continuation of Ser. No. 590,380, Mar. 16, 1984.

[30] Foreign Application Priority Data

Apr. 18, 1983 [JP] Japan ................................. 58-68180

[51] Int. Cl.[4] ............................................. G03B 7/00
[52] U.S. Cl. ...................................... 354/21; 354/410; 354/289.1
[58] Field of Search ................. 354/21, 410, 435, 441, 354/442, 443, 444, 445, 446, 450, 451, 452, 456, 458, 289.1

[56] References Cited

U.S. PATENT DOCUMENTS

| 3,762,285 | 10/1973 | Tenkumo | 354/458 |
|---|---|---|---|
| 4,286,849 | 9/1981 | Uchidoi et al. | 354/442 |
| 4,309,089 | 1/1982 | Harvey | 354/21 |
| 4,320,944 | 3/1982 | Nakai | 354/443 |
| 4,329,029 | 5/1982 | Haskel | 354/443 |
| 4,483,601 | 11/1984 | Sekida et al. | 354/289.1 |

Primary Examiner—Russell E. Adams
Attorney, Agent, or Firm—Louis Weinstein

[57] ABSTRACT

An apparatus for exposure correction is provided for use with a camera of automatic exposure control type. An amount of exposure which is determined on the basis of an output from photometric means is shifted by a given correction value toward overexposure or underexposure in response to the operation of a manual operating member. The correction value can be varied either automatically or manually. The correction value can be changed by automatically reading information given on a film or a film container and representing a film latitude, by manually supplying a film latitude value, or by utilizing information representing a film speed which has a correlation with a film latitude. In this manner, a photograph having an improved gradation can be obtained by effectively utilizing a film latitude.

10 Claims, 18 Drawing Figures

FIG. 14
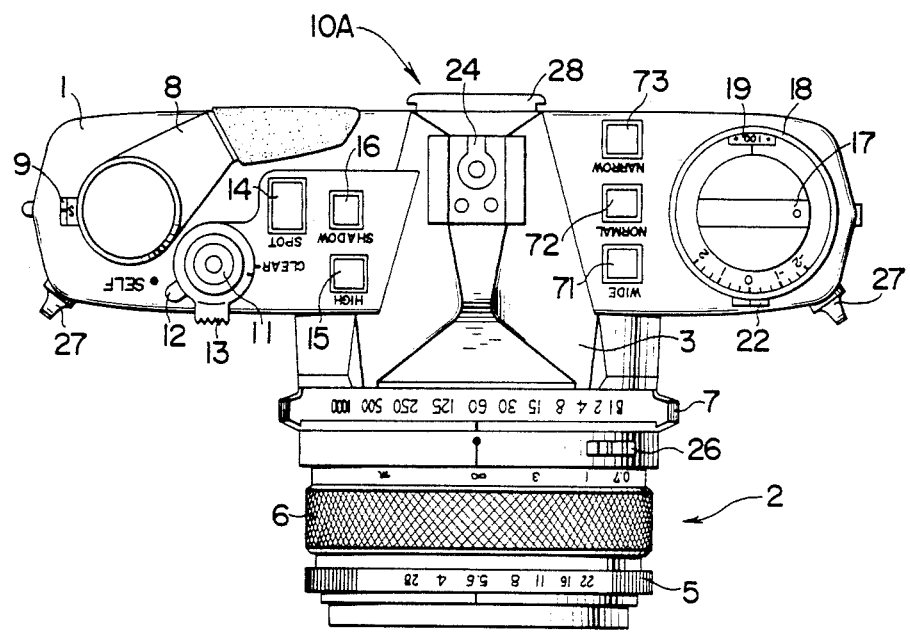
FIG. 16
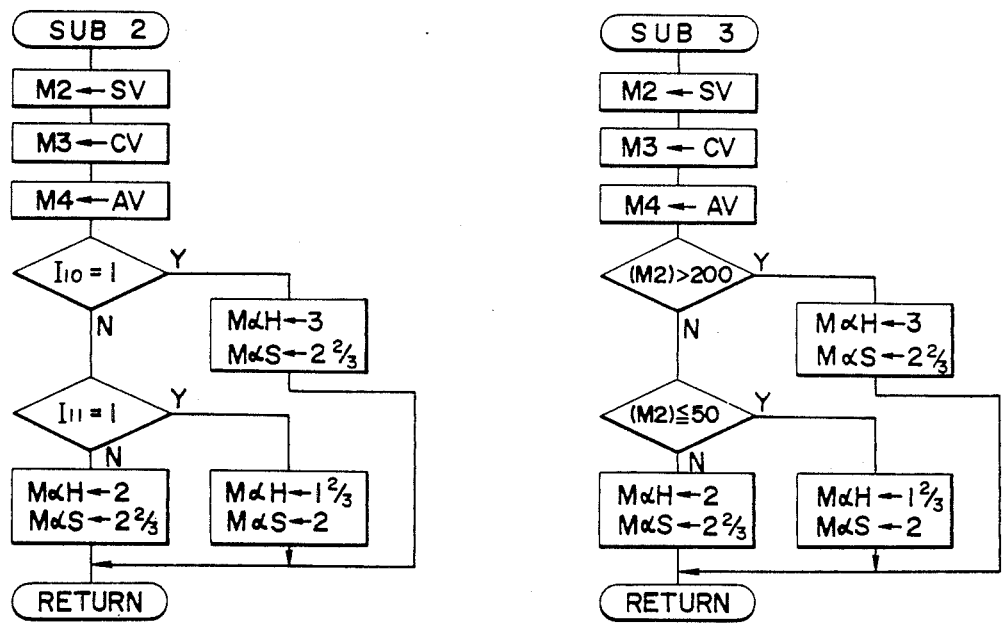
FIG. 18

APPARATUS FOR EXPOSURE CORRECTION

This is a continuation of application Ser. No. 590,380, filed Mar. 16, 1984.

BACKGROUND OF THE INVENTION

The invention relates to an apparatus for exposure correction which may be used in a camera of automatic exposure control type, and more particularly, to such apparatus which provides a correction to an amount of exposure used in a camera of automatic exposure control type which is determined on the basis of an output from photometric means.

A camera of an automatic exposure control type generally adopts an average exposure scheme in which a mean value of the brightness of an object being photographed which is subject to photometry is reproduced as a median value of the film latitude. However, with this average exposure technique, a faithful reproduction is not achieved for an object being photographed, a major portion of which is occupied by a bright or dark area. Also, where the object being photographed exhibits an increased range of brightness, both a highlight and a shadow area are not reproduced (see FIG. 1).

Where the reproduction of tones in the highlight or shadow area is of importance, spotwise photometry is utilized to achieve a highlight or a shadow referenced exposure (see FIG. 1). A photographic camera which automatically enables such a highlight or a shadow referenced exposure is already proposed (U.S. Ser. No. 485,432).

In conducting the highlight of shadow referenced exposure, a shift from the average exposure should be changed in accordance with the film latitude. However, in practice, a uniform shift on the order of 2 EV is practically used so as to adapt with a reversal film having a relatively narrow film latitude. Consequently, the film latitude is not effectively used where a color negative film or a black-and-white film having a greater film latitude is used, leaving an increased zone out of reproduction. Specifically, referring to FIG. 2, it will be seen that an increased range of brightness (hatched portion) is left out of the reproduction when shifting to a narrower latitude R/2 than when shifting to a greater latitude R'/2.

Therefore it will be seen that in order to achieve the reproduction of proper tones in accordance with a particular film latitude, exposure factors may be determined by a manual operation of a photometer as has been done in the prior art practice. However this requires a troublesome procedure and is time consuming, and also disadvantageously requires a complicated calculation.

SUMMARY OF THE INVENTION

In view of the foregoing, it is an object of the invention to provide an apparatus for exposure correction which may be used with a camera of automatic exposure control type, the apparatus including means for shifting an amount of exposure by a given amount toward an overexposure or underexposure with respect to an amount of exposure which is determined on the basis of an output from photometric means, and means for varying the given amount.

Thus, in accordance with the invention, a correction value which is used to determine an amount of exposure can be varied in accordance with the film latitude when conducting a highlight referenced or a shadow referenced photographing operation by means of a camera of an automatic exposure control type. Accordingly, a picture having good reproduction of tones can be conveniently and simply taken of an object being photographed which exhibits an increased range of brightness, effectively utilizing the film latitude.

In addition, information which is indicated on a film or a film container and representing the latitude of a particular film is detected to determine the correction value in an automatic manner. This dispenses with the determination of the film latitude and eliminates an error in establishing the correction value while assuring that a picture having good tones can be taken.

The correction value can also be established by a manual operation, allowing a user to determine the exposure factor rapidly in keeping with the intended photographic composition.

The correction value is automatically determined in conjunction with a member of the camera which is used to establish a film speed. Thus, there is no need to add any mechanism to a conventional camera or a film while facilitating a photographing operation to provide a picture having good tones.

BRIEF DESCRIPTION OF THE DRAWINGS

FIG. 14 is a plan view of a camera in which an apparatus for exposure correction according to another embodiment of the invention is disposed;

FIG. 16 is a flowchart showing the detail of a subroutine SUB2 which is substituted for the subroutine SUB1 shown in FIG. 13;

FIG. 18 is a flowchart of the detail of a subroutine SUB3 which is substituted for the subroutine SUB1 shown in FIG. 13 in the apparatus of FIG. 17.

DESCRIPTION OF PREFERRED EMBODIMENTS

Figure 1:
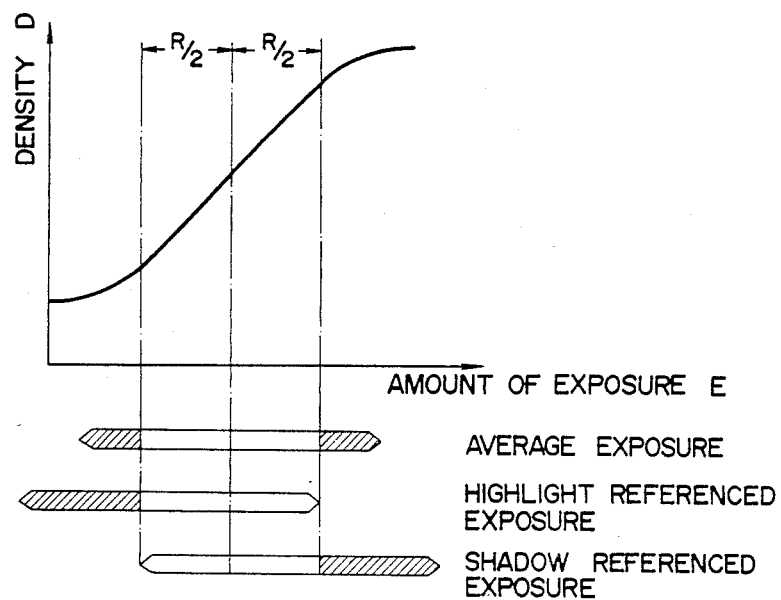
FIG. 1 graphically shows the relationship between film latitude and an average exposure, a highlight referenced exposure and a shadow referenced exposure.
Figure 2:
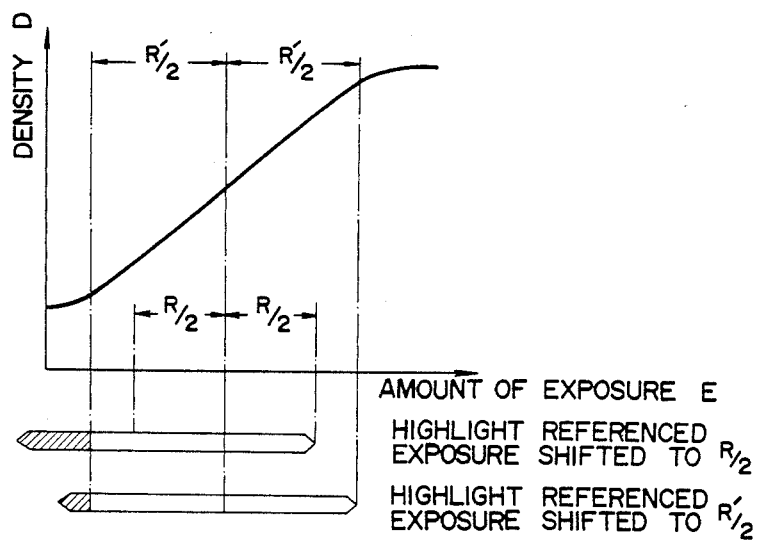
FIG. 2 graphically shows the relationship between film latitude and highlight referenced exposures using different amounts of shift.
Figure 3:
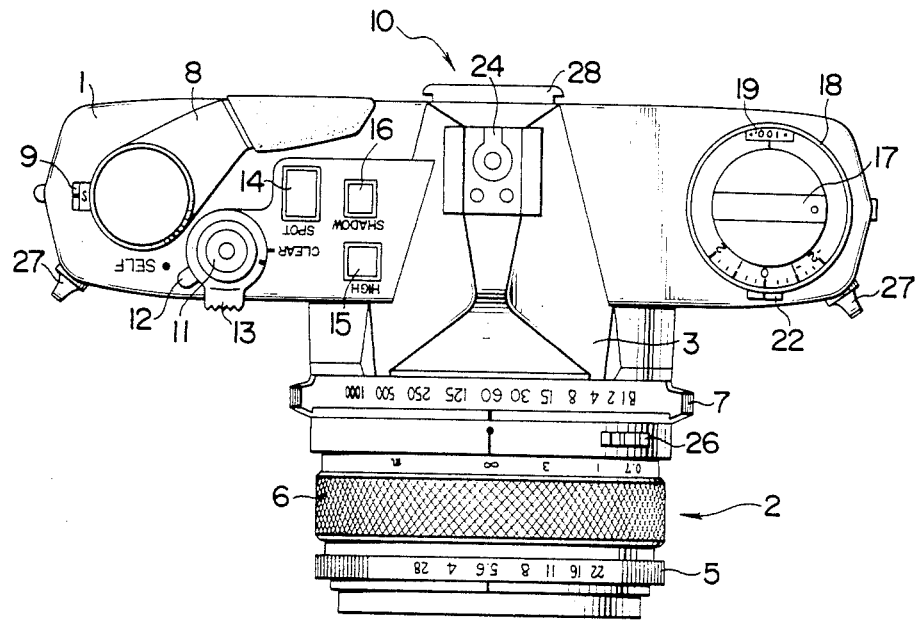
FIG. 3 is a plan view of a camera having apparatus for exposure correction according to one embodiment of the invention.

Referring to FIG. 3, there is shown a plan view of a camera in which an apparatus for exposure correction according to one embodiment of the invention is disposed. A camera 10 represents a single lens reflex camera of automatic exposure control type and includes a body 1. A lens barrel 2 is detachably mounted centrally on the front surface of the body 1. A pentaprism housing 3 in the form of a triangular roof is disposed centrally on the top surface of the body 1. As is well recognized, the barrel 2 houses a taking lens 4 (see FIG. 4) and retains it therein. Rotatably disposed around the barrel 2 are an aperture presetting ring 5, a distance presetting ring 6 and a manual exposure period presetting ring 7 in a sequential manner as viewed from the front toward the back.

It will be noted that a film winding lever 8, a number of film frame indicator window 9, a shutter release button 11, a self-timer operating knob 12, a clear knob 13, a spotwise entry button 14, a highlight command button 15 and a shadow command button 16 are disposed on the top surface of the body 1 in an area located to the left of the pentaprism housing 3. On the other hand, a film rewind knob 17, a film speed presetting dial 18, a film speed indicator window 19 and an exposure correction knob 22 are disposed on the top surface of the body 1 in an area located to the right of the pentaprism housing 3. It will also be noted that a shoe 24 for mounting an electronic flash on the camera is disposed on the top surface of the body 1 on the rear side of the pentaprism housing 3. In FIG. 3, numeral 26 indicates a button which may be used when attaching the lens barrel 2 to the body 1, 27 a fixture for connecting a strap, not shown, to the body 1, and 28 a finder eyepiece window frame.

The spotwise entry button 14 is formed by a self-resetting pushbutton which, when depressed, allows a value of the brightness of an object being photographed, which is determined by spotwise photometry effected through the taking lens 4, to be entered into an electrical circuit of the camera 10 for storage. The button 14 is mechanically interlocked with a spotwise entry switch SW1, to be described later in connection with FIG. 6. The depression of the entry button 14 causes the entry switch SW1 to be closed, allowing a value of the brightness which is determined by the spotwise photometry to be stored. When the entry button 14 is depressed a number of times, a plurality of values of the brightness which are determined by the repeated spotwise photometry are all stored within the camera 10. The clear knob 13, when operated, causes the stored values to be cleared.

The highlight command button 15 is formed by a self-resetting pushbutton which, when depressed, selects a highlight referenced photographing mode in which the exposure process occurs with an amount of exposure which is by a given correction value less than the highest one of values of the brightness which are stored by the depression of the entry button 14 as a result of repeated spotwise photometry. This button is mechanically interlocked with a highlight switch SW6, to be described later in connection with FIG. 6. When the highlight command button 15 is depressed an odd number of times, a highlight referenced photographing mode is selected while when the button is depressed an even number of times, the highlight referenced photographing mode is reset.

The shadow command button 16 is formed by a self-resetting pushbutton which, when depressed, selects a shadow referenced photographing mode in which the exposure process occurs with an amount of exposure which is by a given correction value higher than the lowest one of values of the brightness which are stored by the depression of the entry button 14 as a result of repeated spotwise photometry. This button is mechanically interlocked with a shadow switch SW7, to be described later in connection with FIG. 6. A shadow referenced photographing mode is selected when the button 16 is depressed an odd number of times while this mode is reset when the button 16 is depressed an even number of times.

The selection of either a highlight or a shadow referenced photographing mode is inhibited when there is no storage of values of brightness determined by the spotwise photometry at the time when either the highlight button 15 or the shadow button 16 is depressed. If the shadow command button 16 is depressed when the highlight referenced photographing mode is established, the latter mode is reset while the shadow referenced photographing mode is selected. Conversely, if the highlight command button 15 is depressed when the shadow referenced photographing mode is established, the latter mode is reset while the highlight referenced photographing mode is selected.

Figure 4:
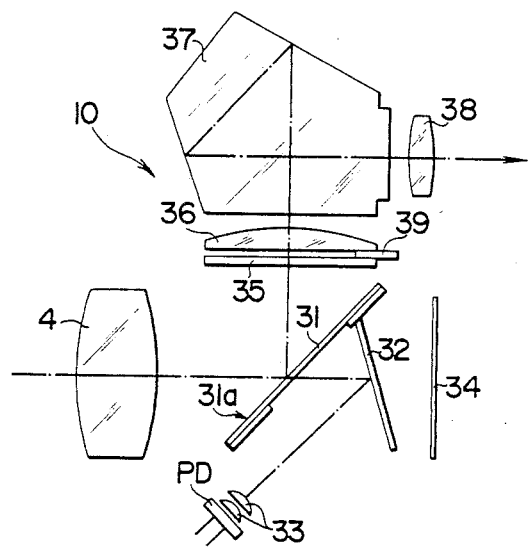
FIG. 4 is a schematic side elevation of an optical system contained within the camera shown in FIG. 3.

FIG. 4 shows the optical system of the camera 10. As is well recognized, the optical system of a single lens reflex camera of automatic exposure control type such as the camera 10 shown includes a movable reflecting mirror 31 which is rotatably mounted and which is normally disposed at an angle of 45° with respect to a taking light path. At this position, the mirror defines a finder optical path. When the finder path is established, light from an object being photographed which passes through the taking lens 4 and impinges inside the camera 10 is reflected upward at right angles so as to be incident on a finder optical system. The finder optical system includes a focussing glass 35 positioned in an optically conjugate relationship with respect to the photosensitive surface of a photographic film 34, a condenser lens 36 disposed directly above the focussing glass 35, a pentaprism 37 disposed directly over the condenser lens 36, and a finder eyepiece 38 disposed in opposing relationship with the rear end face of the pentaprism 37 which represents a light emerging surface. A photographic information display 39 formed by a liquid crystal display panel of light transmission type, to be described later, is interposed between the focussing glass 35 and the condenser glass 36 toward their rear edges.

The movable mirror 31 is centrally formed with a half-silvered area 31a, which is opposed by a totally reflecting mirror 32 which is disposed on the backside of the movable mirror 31 in a movable manner, the mirror 32 being disposed at a given angle with respect to the mirror 31. The totally reflecting mirror 32 reflects light from an object being photographed which has passed through the half-silvered area 31a of the mirror 31 toward the bottom of the camera 10 where a photoelectric transducer element PD is disposed for purpose of spotwise photometry. The transducer element PD receives light reflected by the mirror 32 through a group of condenser lenses 33.

Figure 5:
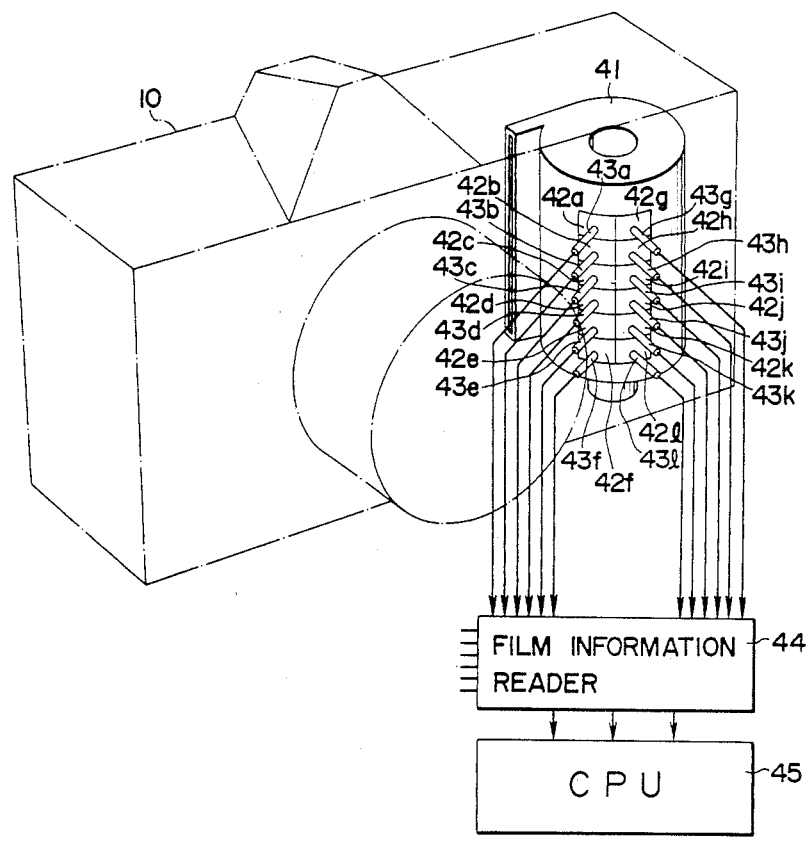
FIG. 5 is a schematic perspective view of one form of film information detecting means which may be disposed within the camera shown in FIG. 3.

FIG. 5 shows an apparatus for exposure correction according to one embodiment of the invention, and specifically shows means for detecting film information. A film patrone 41 has a series of conductive or non-conductive information patterns 42a to 42l formed on its outer peripheral surface as by printing. The detecting means comprises a plurality of electrical contacts 43a to 43l which are capable of individually contacting the patterns 42a to 42l, respectively. The conduction or non-conduction established between the patterns 42a to 42l and the contacts 43a to 43l is effective to read film information as a binary code. As shown, the patterns 42a to 42l are disposed in an array comprising two columns and six rows, and accordingly the contacts 43a to 43l are disposed in a corresponding array. Thus, twelve contacts project into a patrone chamber defined within the camera 10. Each of the contacts 43a to 43l is connected to a film information reader 44. The contacts 43f to 43l represent common terminals. The contacts 43a to 43f represent film speed information defined by the conduction or non-conduction between the contacts 43a to 43e and the common contact 43f. This information is fed through the reader 44 to a film speed presetting circuit, not shown. The contacts 43i to 43l represent a number of film frame information defined by the conduction or non-conduction between the contacts 43i to 43k and the common contact 43l. This information is fed through the reader 44 to a film counter, not shown. The contacts 43g, 43h and 43l represent film latitude information, which is fed through the reader 44 to a central processing unit 45 (hereafter abbreviated as CPU 45), which comprises a microcomputer.

In the apparatus of the present embodiment, the electrical contacts 43a to 43l are used to detect information patterns 42a to 42l formed on the film patrone 41. However, in the event film information is formed on the film itself, for example, any other detecting means may be used which is capable of detecting such information.

Figure 6:
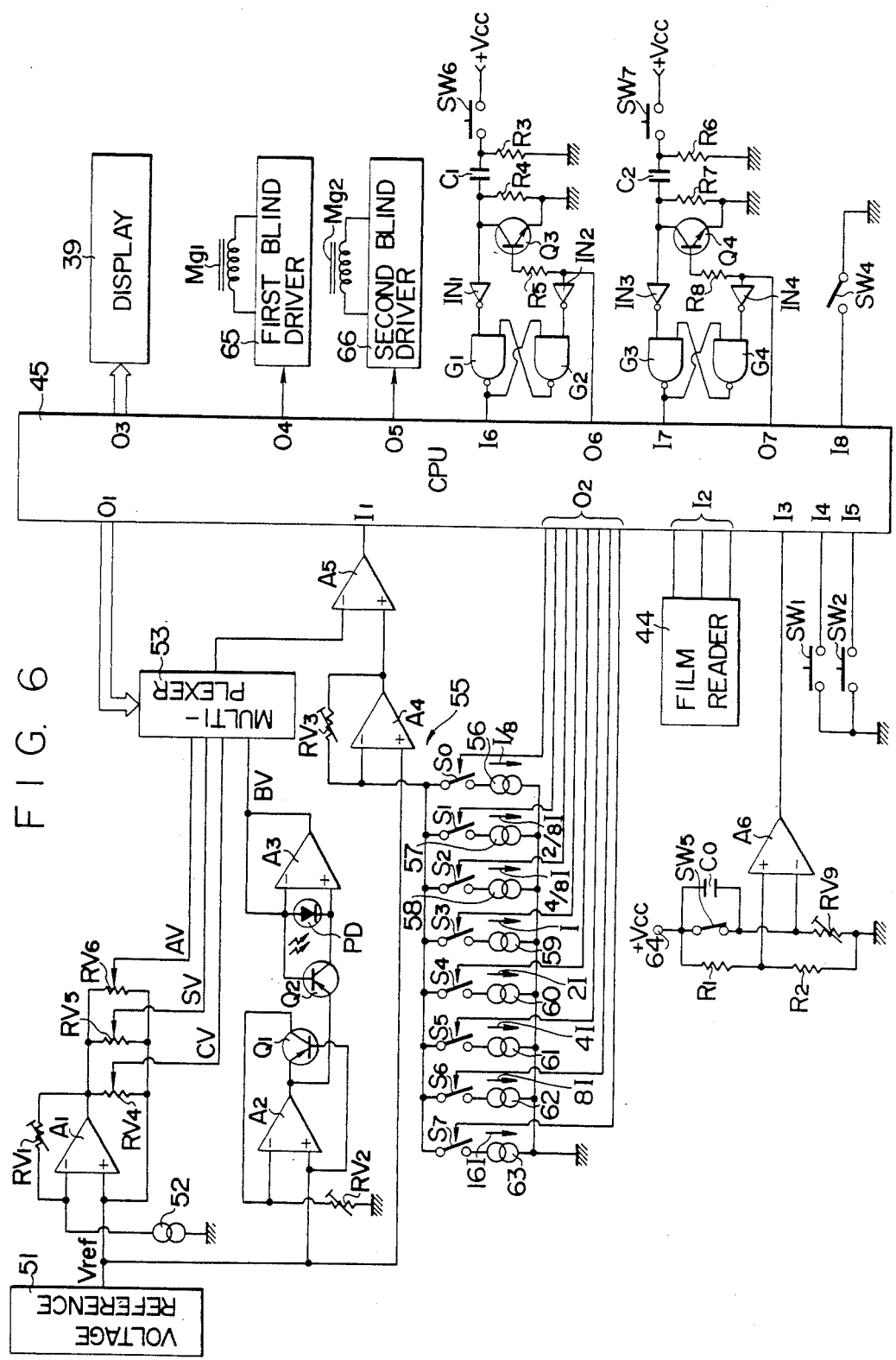
FIG. 6 is a circuit diagram of an apparatus for exposure correction according to one embodiment of the invention which may be disposed within the camera of FIG. 3.

FIG. 6 is a circuit diagram of an electrical circuit of the apparatus for exposure correction according to one embodiment of the invention. Specifically, there is provided a reference voltage circuit 51 which develops a reference voltage Vref at its output, which is connected to non-inverting inputs of operational amplifiers A1, A2 and A4. The inverting input of the amplifier A1 is connected to the ground through a constant current source 52, and is also connected to the output thereof through a semi-fixed resistor RV1 which operates to adjust the reference voltage Vref for purpose of introducing a variety of photographing information. Connected between the output and the non-inverting input of the amplifier A1 are a variable resistor RV4 which is used to introduce an exposure correction value CV, a variable resistor RV5 which is used to introduce a film speed value SV, and a variable resistor RV6 which is used to introduce an aperture value AV, in parallel relationship with each other. Movable sliders on these variable resistors RV4 to RV6 are connected to individual inputs of a multiplexer 53 which is formed by a plurality of analog switches.

The inverting input of the amplifier A2 is connected to the ground through a semi-fixed resistor RV2 which is used to adjust a brightness value BV of an object being photographed which is determined by the spotwise photometry, and is also connected to the collector of a PNP transistor Q1. The transistor Q1 has its emitter connected to the output of the amplifier A2 and its base connected to the non-inverting input of the amplifier A2. The output of the amplifier A2 is also connected to the emitter of a PNP transistor Q2, the collector and base of which are respectively connected to the non-inverting and the inverting input of an operational amplifier A3. The transducer element PD (see FIG. 4) has its anode connected to the inverting input and its cathode connected to the non-inverting input of the amplifier A3. The inverting input of the amplifier A3 is connected to the output thereof, which is in turn connected to an input of the multiplexer 53 which receives a spotwise brightness value BV.

As mentioned previously, the multiplexer 53 is formed by a plurality of analog switches, and has four inputs which receive an output voltage from the amplifier A1 as modified by the variable resistor RV4 to determine a correction value CV, an output voltage from the amplifier A1 as modified by the variable resistor RV5 to define a film speed value SV, an output voltage from the amplifier A1 as modified by the variable resistor RV6 to define an aperture value AV, and an output voltage from the amplifier A3 which defines a spotwise brightness value BV. The purpose of the multiplexer 53 is to select one of these inputs, and to this end, it has a control input which is connected to an output port O1 of CPU 45.

The output of the multiplexer 53 is connected to the inverting input of a comparator A5, which forms an A/D conversion circuit of sequential comparison type together with a D/A converter 55. The converter 55 comprises an operational amplifier A4, a semi-fixed resistor RV3 which is effective to adjust an output level from the converter 55, a plurality of analog switches S0 to S7 which are turned on and off by an instruction from CPU 45, and a plurality of reference current sources 56 to 63 which are connected in series with the analog switches S0 to S7, respectively. The output of the amplifier A4 is connected to the non-inverting input of the amplifier A5, and the semi-fixed resistor RV3 is connected across the output and the inverting input of the amplifier A4. The analog switches S0 to S7 have their one end connected to the inverting input of the amplifier A4 while their other end is connected to the ground through each of current sources 56 to 63, respectively.

Each of the analog switches S0 to S7 has a control input which is connected to one of the outputs of port O2 of CPU 45 so that a command from CPU 45 turns these switches S0 to S7 on and off. The current sources 56 to 63 supply a reference current having a magnitude of I/8, 2I/8, 4I/8, I, 2I, 4I, 8I and 16I, respectively. As the analog switches S0 to S7 are turned either on or off by commands from CPU 45, a weighted current passes through the individual switches S0 to S7. The output of the comparator A5 is connected to an input port I1 of CPU 45.

The film information reader 44 is connected to inputs of input port I2 of CPU 45. As mentioned previously, film information fed to the reader 44 includes twelve bits, and the inputs of input port I2 receive three of these bits, namely, two bits relating to film latitude and another bit which indicates whether or not the film patrone 41 has a record indicating such film information. The two least significant bits representing film latitude indicates that a film used has an increased latitude when they are "01", a film having a narrow latitude when they are "10", and a film having an average latitude when they are "11". The most significant bit which indicates whether such film information is present or absent indicates the presence of such information when it is "1" and the absence of such information when it is "0". It is to be noted that in the latter instance, the two least significant bits are "00". It is to be noted that having once read information, the reader retains such information for output to CPU 45 until a rear lid, not shown, of the camera 10 is opened.

A normally closed trigger switch SW5 which becomes open at the beginning of running of a first shutter blind upon shutter release is connected in a trigger delay circuit including a comparator A6. The trigger switch SW5 has its one end connected to a terminal 64, to which an operating voltage +Vcc is applied, and has its other end connected to the inverting input of the comparator A6 and also connected to the ground through a semi-fixed resistor RV9, which is used to adjust a triggering delay time. The switch SW5 is shunted by a capacitor C0, which forms a time constant circuit together with the semi-fixed resistor RV9. Resistors R1 and R2 are connected in series across the terminal 64 and the ground, with the junction therebetween being connected to the non-inverting input of the comparator A6. The output of the comparator A6 is connected to an input port I3 of CPU 45. CPU 45 also includes an input port I4 which is connected to one end of a normally open spotwise entry switch SW1 which is closed in response to the depression of the spotwise entry button 14. The other end of the switch SW1 is connected to the ground. CPU 45 also includes an input port I5 which is connected to one end of a normally open clear switch SW2 which is closed in interlocked relationship with a turning of the clear command knob 13, the other end of the switch SW2 being connected to the ground. The purpose of the clear switch SW2 is to clear any spotwise brightness value or values which are stored within CPU 45 as a result of the closure of the spotwise entry switch SW1.

CPU 45 has an output port O3 which is connected to the input of the photographing information display 39 formed by a liquid crystal display panel. CPU 45 also has an output port O4 which is connected to the input of a first shutter blind drive circuit 65 including an electromagnet Mg1 which constrains a first shutter blind from running. CPU 45 also has an output port O5 connected to the input of a second shutter blind drive circuit 66 including an electromagnet Mg2 which constrains a second shutter blind from running.

The highlight command button 15 and the shadow command button 16 (see FIG. 3) are associated with a normally open highlight switch SW6 and a shadow switch SW7, respectively, which are closed upon depression of such button 15 or 16. The highlight switch SW6 has its one end connected to receive an operating voltage +Vcc and its other end connected to the ground through a resistor R3 and also connected to one end of a capacitor C1. The other end of the capacitor C1 is connected to the ground through a resistor R4 and is also connected to the collector of an NPN transistor Q3 and to the input of an inverter IN1. The output of the inverter IN1 is connected to one input of NAND gate G1. The transistor Q3 has its emitter connected to the ground and its base connected through a resistor R5 to the input of an inverter IN2 and to an output port O6 of CPU 45. The output of the inverter IN2 is connected to one input of NAND gate G2. The output of the gate G1 is connected to the other input of the gate G2, the output of which is in turn connected to the other input of the gate G1. In this manner, the combination of gates G1, G2 forms an RS flipflop. The output of the gate G1, which represents the output of the flipflop, is connected to an input port I6 of CPU 45. The shadow switch SW7 is connected to an input port I7 and an output port O7 of CPU 45 through a circuit similar to the circuit associated with the highlight switch SW6 and including resistors R6 to R8, capacitor C2, transistor Q4, inverters IN3, IN4 and NAND gates G3, G4.

CPU 45 also has an input port I8 which is connected to the ground through a release switch SW4 which is closed at the beginning of the upward movement of the movable mirror 31 upon depression of the shutter release button 11 (see FIG. 3) and which is opened at the end of the downward movement of the mirror 31. It is to be noted that input ports I1 to I8 of CPU 45 internally include pull-up resistors, not shown, so that the application of a signal to one of these input ports changes the level at that port from "1" to "0".

Figure 7:
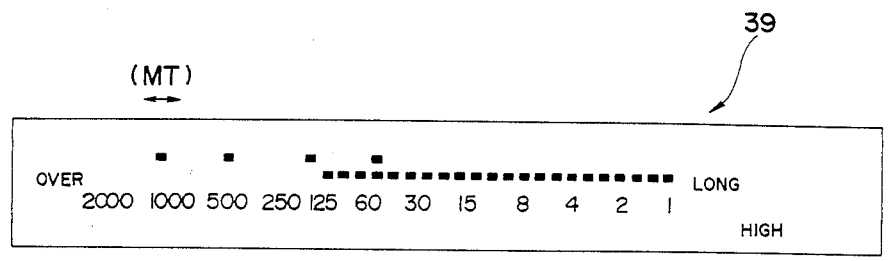
FIGS. 7 to 9 are front views of a photographing information display shown in FIG. 6, illustrating different manners of display.
Figure 8:
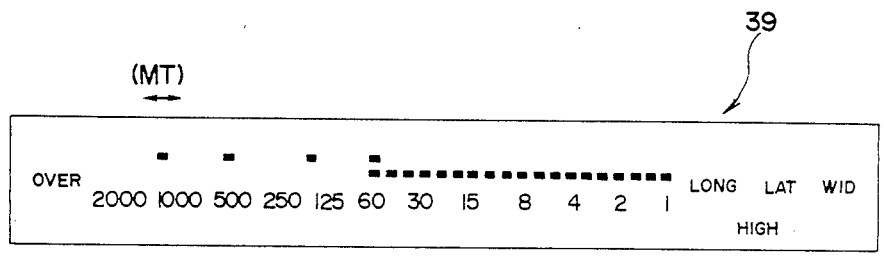
Figure 9:
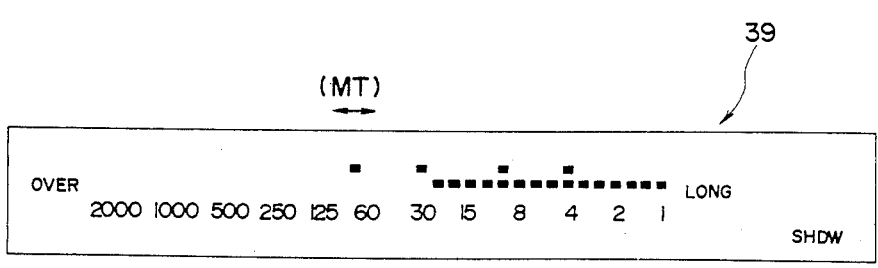

FIGS. 7 to 9 illustrate several different manners of display provided by the photographing information display 39. As mentioned previously, the display 39 is formed by a liquid crystal display panel which is known in itself, and includes a linear array of exposure period electrodes "2000" to "1" (indicating an exposure period from 1/2000 to one second), a linear array of rectangular shaped segment electrodes, inclusive of "OVER" and "LONG" electrodes located adjacent to the opposite ends of the array, all of which are disposed directly above the exposure period electrodes and providing a bar display, another linear array of rectangular shaped segment electrodes disposed directly above the bar display segment electrodes and providing a point display, as well as "HIGH" electrode indicating a highlight referenced photographing mode, "SHDW" electrode indicating a shadow referenced photographing mode, "LAT", "WIDE", "NOR" (not shown) and "NAR" (not shown) electrodes representing "latitude", "wide", "normal" and "narrow" to indicate the magnitude of the film latitude, and "±" electrode (not shown) which indicates the presence or absence of an exposure correction. Each of these electrodes is formed by a transparent electrode, whereby the display 39 is of light transmission type. The segment electrodes which provide a bar display are used to indicate an exposure period, during which the shutter is actually opened, in the form of a bar. The segment electrodes which provide a point display are used to indicate an exposure period corresponding to each brightness value entered in response to spotwise photometry, in the form of a point.

The operation of the apparatus for exposure correction will now be described with reference to flowcharts shown in FIGS. 10 to 13. It is to be noted that in the description to follow, MX (where X represents any letter or number) represents a memory address and (MX) represents a content stored in a memory at the address MX. The notation "→" represents a transfer operation. For example, "MN→0" represents the storage of "0" into a memory at an address MN. By way of another example, "M7→(M1)" represents the transfer of the content of a memory at an address M1 into a memory at an address M7.

When the power supply for the camera 10 is initially turned on, the electrical circuit shown in FIG. 6 is fed from the power supply, and various parts of the circuit become operative. CPU 45 starts a program as shown by a flowchart illustrated in FIG. 10, initializing flags and memories. To initialize a number of spotwise entries memory MN, "0" is stored therein. A spotwise entry detecting flag MS which confirms whether or not the depression of the spotwise entry switch SW1 has been updated is initialized by storing "0" therein. A highlight detecting flag MU is initialized by storing "1" therein. Similarly, a shadow detecting flag MV is initialized by storing "1" therein.

A decision to see if I5=0 is then made to sense whether or not the clear knob 13 has been operated. If the clear knob 13 has been operated and the clear switch SW2 is turned on, I5=0. Accordingly, an exit is made through YES (which is indicated by Y in the flowcharts shown in the drawings) from this decision block, followed by storing "0" in the memory MN to clear the number of spotwise entries. If the knob 13 has not been operated and the clear switch SW2 is off, an exit is made through NO (which is indicated by N in the flowcharts shown in the drawings) from the decision block of I5=0.

Figure 13:
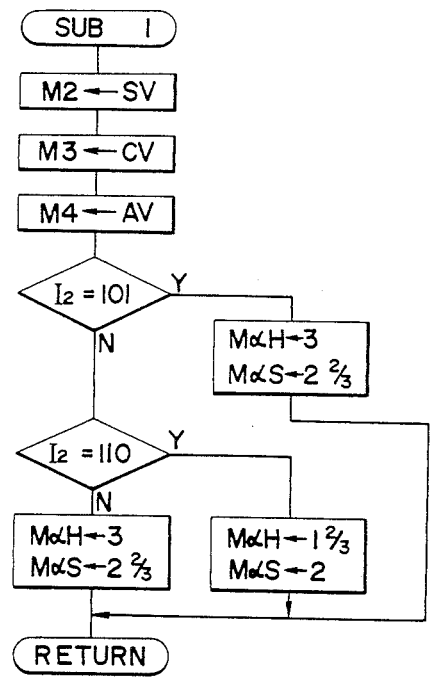
FIG. 13 is a flowchart showing the detail of a subroutine SUB1 used in the flowchart of FIG. 10.

The program then transfers to a subroutine SUB1 shown in FIG. 13 where a film speed value SV is fed to a film speed value save memory M2, a correction value CV is fed to a correction value save memory M3 and an aperture value AV is fed to an aperture value save memory M4. Feeding this photographing information is accomplished in the electrical circuit shown in FIG. 6 by deriving voltages corresponding to the film speed value SV, correction value CV and aperture value AV at the output of the multiplexer 53 in a sequential manner, and then converting them into a corresponding digital quantity through the A/D conversion circuit, formed by the converter 55 and the comparator A5, for input to the input port I1.

A decision is then made to see if I2=101, determining whether or not the film has a wide film latitude. If the film has an increased latitude, an exit is made through YES from this decision block, and "3" is stored in a highlight correction value save memory M$\alpha$H and "2⅔" is stored in a shadow correction value save memory M$\alpha$S. Subsequently, the program returns to the flowchart shown in FIG. 10. The values "3" and "2⅔" stored in the memories M$\alpha$H and M$\alpha$S are in EV units, but in actuality, an additional constant is accumulated or added thereto for the purpose of the program processing. (This also applies to the subsequent description.)

If the film does not have a wide latitude, an exit is made through NO from the decision block of I2=101, and a decision is then made to see if I2=110, thus determining whether the film has a narrow latitude. If the film has a narrow latitude, an exit is made through YES from this decision block, and "1⅔" is stored in the highlight correction value save memory M$\alpha$H and "2" is stored in the shadow correction value save memory M$\alpha$S. The program then returns to the flowchart shown in FIG. 10. If the film does not have a narrow latitude, an exit is made through NO from the decision block of I2=110. This means that the film has a normal latitude or that the film patrone 41 does not carry an indication of film information (patterns 42a to 42l). Accordingly, "2" is stored in the highlight correction value save memory M$\alpha$H and "2⅔" is stored in the shadow correction value save memory M$\alpha$S. Subsequently, the program returns to the flowchart shown in FIG. 10.

Returning to FIG. 10, a decision is then made to see if (M3)=C1, thus determining whether or not there is a correction. If a correction is present, an exit is made from this decision block through NO, displaying "±" mark. If there is no correction, an exit is made through YES from the decision block of (M3)=C1, erasing the "±" mark. A brightness value BV is then supplied to a brightness value save memory MB. The brightness value BV is supplied in a manner similar to the film speed value SV, the correction value CV and the aperture value AV mentioned above. A calculation is then made according to a formula MT→(MB)+(M2)−(M4), thus calculating an exposure period TV which corresponds to the brightness value BV which is being now determined. This exposure period value is stored in an exposure period value save memory MT. It is to be noted that during the calculation of the exposure period value TV which corresponds to the brightness value BV which is being determined, the correction value CV is not considered. Subsequently, the exposure period value TV or (MT) is then displayed in a point form by the display 39 (see FIG. 7). It will be understood that the point display shifts to the left or to the right depending on a change in the brightness value BV being determined.

A decision to see if IF=0 is then made to determine whether or not the spotwise entry operation has been made. If no entry operation is made, an exit is made through NO from this decision block, followed by storing "0" in a spotwise entry detecting flag MS. A decision to see if (MN)=0 then follows. This decision determines whether or not there is any spotwise brightness value which has already been entered. If the spotwise entry operation has not been made until that time, an exit is made through YES from this decision block, and the program returns to the entrance of the decision block of I5=0, through ①-①.

On the other hand, if a spotwise entry operation has been made, an exit is made through YES from the decision block of I4=0, followed by a decision to see if (MS)=0, thus determining whether a spotwise entry is to be done. During the first pass, it is assured that the content of the spotwise entry detecting flag MS is always equal to "0" subsequent to the spotwise entry operation. Accordingly, an exit is made through YES from the decision block of (MS)=0. This results in adding "1" to the content of the number of spotwise entries memory MN. If this is the first spotwise entry, the content of the memory MN is then equal to "1". A decision to see if (MN)=11 then follows, which determines whether this is the eleventh entry. If this is the eleventh entry, an exit is made through YES from this decision block, and the content of the number of spotwise entries memory MN is again initialized to "1" by a procedure represented by MN→(MN)−10. Such procedure is required in view of the number of memories which provide spotwise brightness value save areas NBn.

If this is not the eleventh spotwise entry, an exit is made through NO from the decision block of (MN)=11. To store the fact that a spotwise entry has been made by the current operation, "1" is stored in the spotwise entry detecting flag MS, followed by supplying a brightness value BV to the spotwise brightness value save area MBn where n represents the content (MN) of the number of spotwise entries memory MN. The program then returns to the entrance to the decision block of I5=0 through ①-①.

During a second pass subsequent to the spotwise entry operation, it will be seen that when the decision block I4=0 is encountered, an exit is made through YES therefrom since the time length required for one cycle of the program is normally far less than the time required for operating the spotwise entry button 14 (see FIG. 3). However, since the flag MS stores "1", an exit is made through NO from the decision block of (MS)=0, thus preventing the brightness value BV of the same operation from being entered into the save area MBn. It will be noted that when the spotwise entry operation is released, an exit is made through NO from the decision block of I4=0, whereby the flag MS is cleared to zero, thus enabling the entry of the spotwise brightness value BV during the next spotwise entry operation.

Figure 11:
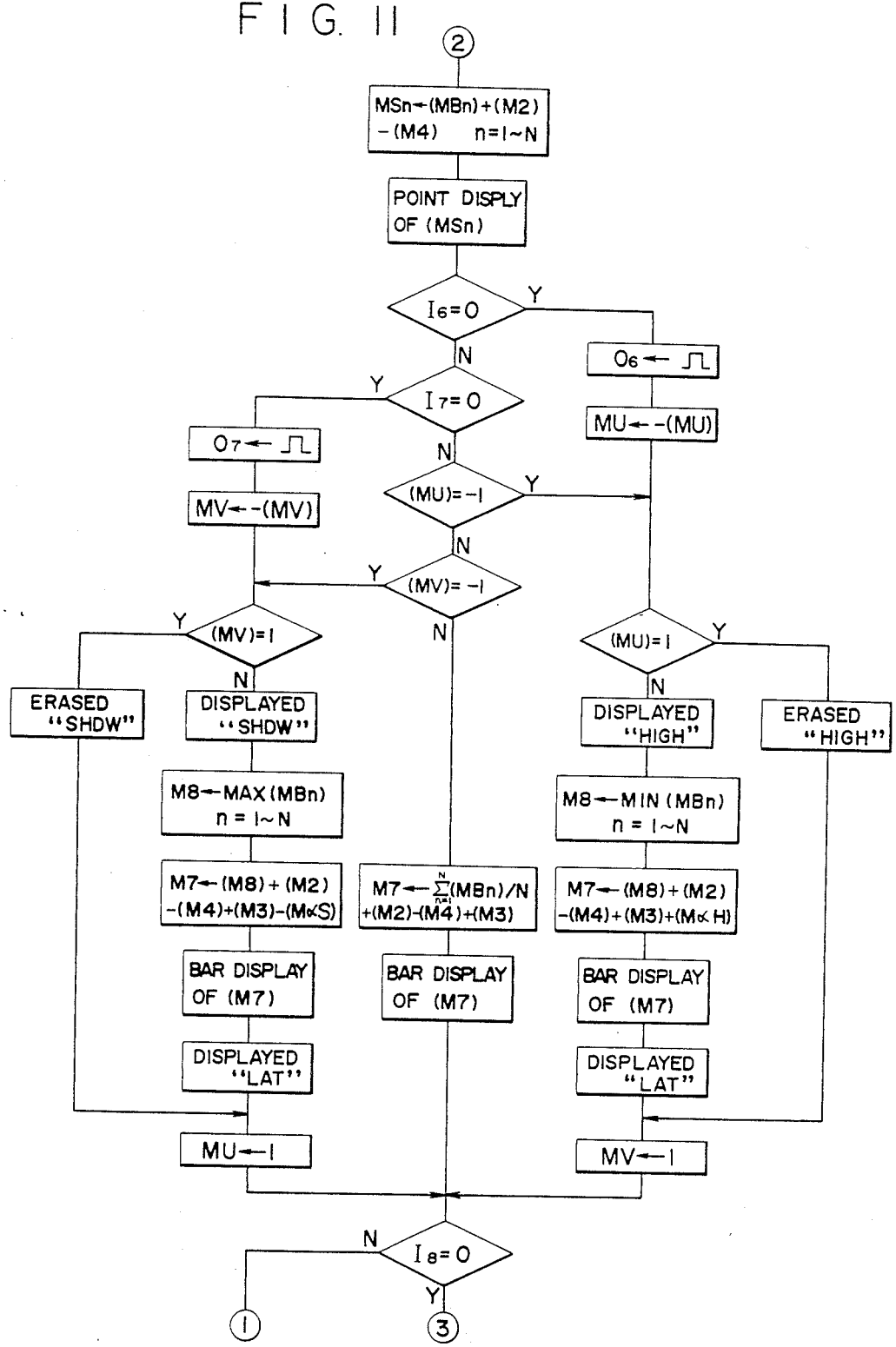

If the decision block of (NM)=0 is encountered when certain spotwise brightness value or values have been entered, an exit is made through NO therefrom, whereby the program transfers to the flowchart shown in FIG. 11 through ②-②. Here, an exposure period value TV corresponding to each of spotwise brightness values BV which have already been entered is calculated according to the formula MSn→(MBn)+(M2)−(M4) for n=1 to N, and is stored in each save area MSn. Each of the exposure period values TV obtained in this manner or (MSn) is displayed by the photographing information display 39 in a point form. FIG. 7 illustrates a case where three spotwise brightness values BV have already been entered.

A decision to see if I6=0 is made to determine if the highlight command button 15 has been operated. If the button 15 has not been operated, an exit is made therefrom through YES, delivering a positive output at the output port O6. This resets the flipflop (G1, G2) connected to the input port I6. Subsequently, the content of the highlight detecting flag MU is inverted. The highlight detecting flag MU indicates that the highlight referenced photographing mode has been selected when it contains "−1", and indicates that a mode other than the highlight referenced photographing mode has been selected when it contains "1". The content of the flag MU is inverted since the highlight referenced photographing mode is established by operating the highlight command button 15 an odd number of times, and is reset by operating it an even number of times. A decision is then made to see if (MU)=1, thus determining whether the highlight referenced photographing mode has been selected. If it is, an exit is made through NO from this decision block, and "HIGH" is displayed (see FIG. 7).

Subsequently, a maximum one of brightness values which have been supplied by the spotwise entry is stored in a memory M8 by a procedure M8→MIN(MBn) for n=1 to N. An exposure period value TV corresponding to the maximum brightness value which is shifted by a correction value (MαH) toward the dark side is calculated and stored in a memory M7, according to a formula M7→(M8)+(M2)−(M4)+(M3)+(MαH). It will thus be seen that the correction value CV (M3) is included in this calculation. The exposure period value TV or (M7) is then displayed in a bar form by the display 39 (see FIG. 7). If the film patrone 41 is provided with information patterns 42a to 42l, corresponding display is made to indicate whether the film latitude "LAT" is wide ("WID"), narrow ("NAR") or normal ("NOR") (see FIG. 8). "1" is then stored in the shadow detecting flag MV to reset it, followed by a decision to see if I8=0. If the highlight referenced photographing mode has not been selected during the decision of (MU)=1, an exit is made through YES therefrom and the indicia "HIGH" is erased from the display and the shadow detecting flag MV is reset, followed by the decision to see if I8=0.

In the flowchart of FIG. 11, if the highlight command button 15 has not been operated, an exit is made through NO from the decision block of I6=0, and then a decision is made to see if I7=0 to determine if the shadow command button 16 has been operated. If the button 16 has been operated, an exit is made through YES from the decision block of I7=0, delivering a positive output at the output port O7. This resets the flipflop (G3, G4) connected to the input port I7. The content of the shadow detecting flag MV is then inverted. This flag MV indicates that the shadow referenced photographing mode has been selected when it contains "−1", and indicates that a mode other than the shadow referenced photographing mode has been selected when it contains "1". The content of the flag MV is inverted since the shadow referenced photographing mode is established by operating the shadow command button 16 an odd number of times, and is reset by operating it an even number of times. A decision is made to see if (MV)=1, thus determining if the shadow referenced photographing mode has been selected. It it is, an exit is made from this decision block through NO, and the indicia "SHDW" is displayed (see FIG. 9).

Subsequently, the minimum one of brightness values which are obtained by the spotwise entry is stored in the memory M8 by a calculation of M8→MAX(MBn) for n=1 to N. An exposure period value TV corresponding to the minimum brightness value which is shifted by a correction value (MαS) toward the bright side is calculated and stored in the memory M7 according to a formula M7→(M8)+(M2)−(M4)+(M3)−(MαS). It will be seen that the correction value CV or (M3) is included in this calculation. The exposure period value TV or (M7) thus determined is displayed in a bar form by the display 39 (see FIG. 9). If the film patrone 41 is formed with information patterns 42a to 42l, a display is then made indicating whether the film latitude is wide, narrow or normal. "1" is then stored in the flag MU to reset it, followed by a decision to see if I8=0. If the shadow referenced photographing mode has not been selected when making a decision of (MV)=1, an exit is made through YES therefrom and indicia "SHDW" is erased, and the highlight detecting flag MU is reset, followed by the decision of I8=0.

In the flowchart of FIG. 11, if the shadow command button 16 has not been operated, an exit is made through NO from the decision block of I7=0, followed by a decision to see if (MU)=−1, thus determining whether the highlight referenced photographing mode has been selected. If it is, an exit is made through YES therefrom and a decision is once made to see if (MU)=1, from which an exit is made through NO, followed by the calculation and the display in the bar form of the exposure period value TV in the highlight referenced photographing mode, as mentioned previously. If the highlight referenced photographing mode has not been selected, an exit is made through NO from the decision block of (MU)=−1, followed by a decision to see if (MV)=−1, thus determining whether the shadow referenced photographing mode is selected. If it is, an exit is made through YES therefrom, and a decision is once made to see if (MV)=1, from which an exit is made through NO, followed by the calculation and the display in the bar form of the exposure period value TV in the shadow referenced photographing mode, as mentioned previously.

If the shadow referenced photographing mode has not been selected as well, an exit is made through NO from the decision block of (MV)= −1, and an exposure period value TV corresponding to a mean value of brightness values supplied by the spotwise entry is calculated and stored in the memory M7 according to a procedure $$M7 = \sum_{n=1}^{N} (MBn)/N + (M2) - (M4) + (M3).$$

It will be seen that the correction value CV or (M3) is included in this calculation. The exposure period value TV or (M7) thus determined is displayed in a bar form by the display 39, followed by a decision to see if I8=0.

The decision of I8=0 determines whether or not a shutter release operation has been made. If the shutter release operation has not been made, an exit is made through NO from this decision block, and the program returns to the entrance of the decision block of I5=0 in the flowchart shown in FIG. 10 through ①-①. If the shutter release operation has been made, an exit is made through YES from the decision block of I8=0, and the program transfers to the shutter release flowchart shown in FIG. 12 through ③-③.

Figure 12:
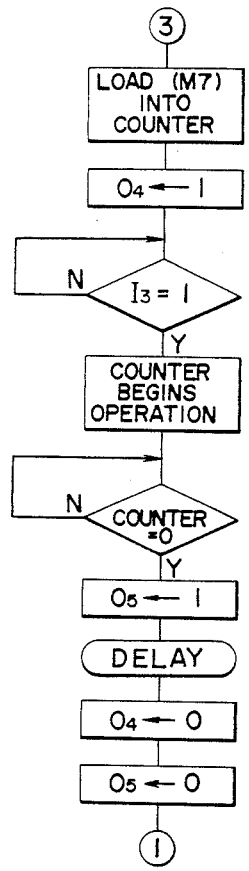

In the flowchart of FIG. 12, the exposure period value TV or (M7) which has been determined in the manner mentioned above is loaded into a timer counter. "1" is delivered at the output port O4, which causes the first shutter blind drive circuit 65 to energize the electromagnet Mg1 which is used to constrain the first blind against running, thus allowing the first blind to begin running. A decision to see if I3=1 then follows, determining whether or not an exposure process has been initiated as a result of running of the first blind. An exit is made through NO from this decision block and loops around this decision block until the exposure process is initiated. When the exposure process is initiated, an exit is made through YES from this decision block, allowing the timer counter to begin its operation. Subsequently, a decision is made to see if the content of the timer counter is equal to zero, looping around this decision block until the counter counts down to zero. When the counter counts down to zero, an exit is made from a decision block of timer counter =0, delivering "1" at the output port O5. This causes the second shutter blind drive circuit 66 to energize the electromagnet Mg2, allowing the second shutter blind to be released from constraint and begin running. This terminates the exposure process. Accordingly, after a given time delay which is determined by a subroutine DELAY, "0" is delivered at the output ports O4 and O5, initializing the both drive circuits 65 and 66. The program then returns to the entrance of the decision block of I5=0 in the flowchart of FIG. 10 through ①-①.

FIG. 14 is a plan view of a camera including an apparatus for exposure correction according to another embodiment of the invention. A camera 10A shown is essentially similar to the camera 10 shown in FIG. 3 except that a wide select button 71, a normal select button 72 and a narrow select button 73, all indicating the film latitude, are added. Specifically, these select buttons are disposed in juxtaposed relationship on the top face of the camera body 1 to the right of the pentaprism housing 3 and at a location toward this housing. In this embodiment, the provision of these select buttons allow a correction value which is used during the highlight or the shadow referenced photographing operation to be manually established. Accordingly, information representing a film latitude is not supplied to CPU 45 through electrical contacts 43a to 43l and the film information reader 44 as shown in FIG. 5.

Figure 15:
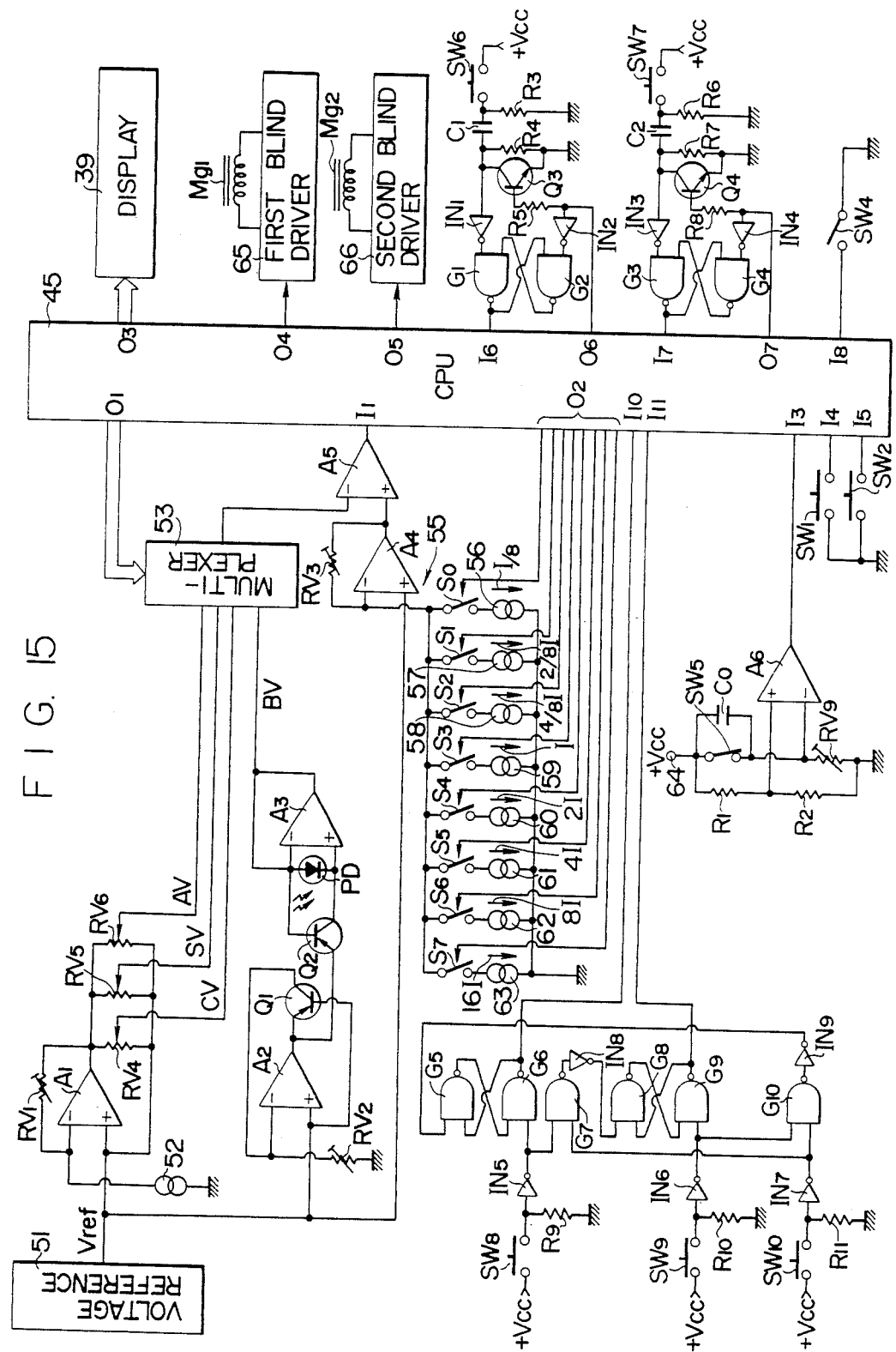
FIG. 15 is a circuit diagram of an apparatus for exposure correction disposed within the camera of FIG. 14 and constructed according to another embodiment of the invention.

Referring to FIG. 15, it will be noted that the wide select button 71, normal select button 72 and narrow select button 73 are mechanically associated with a wide switch SW8, a normal switch SW10 and a narrow switch SW9, respectively. Each of these switches is formed by a normally open switch and has its one end connected to be supplied with the operating voltage +Vcc. The other end of the wide switch SW8 is connected to the ground through a resistor R9 and is also connected to the input of an inverter IN5, the output of which is connected to one input of NAND gate G6 and to one input of NAND gate G7. The other input of the gate G6 is connected to the output of NAND gate G5. The output of the gate G6 is connected to one input of the gate G5. The other input of the gate G5 is connected to the output of an inverter IN9. The combination of gates G5, G6 forms a flipflop and has an output defined by the output of the gate G6 which is connected to an input port I10 of CPU 45.

The other end of the narrow switch SW9 is connected to the ground through a resistor R10 and is also connected to the input of an inverter IN6, the output of which is connected to one input of NAND gate G9 and to one input of NAND gate G10. The other input of the gate G9 is connected to the output of NAND gate G8. The output of the gate G9 is connected to one input of the gate G8, the other input of which is connected to the output of an inverter IN8. The combination of gates G8, G9 forms a flipflop having an output defined by the output of the gate G9 which is connected to an input port I11 of CPU 45. The other end of the normal switch SW10 is connected to the ground through a resistor R11 and is also connected to the input of an inverter IN7, the output of which is connected to the other input of the gates G7, G10. The outputs of the gates G7, G10 are connected to the input of the inverters IN8, IN9, respectively.

It is to be understood that parts of the apparatus of the present embodiment and the camera 10A incorporating it and which have not been specifically referred to are constructed quite similar to those shown in the embodiment of FIGS. 3 to 9 and the camera 10 incorporating it. Accordingly, similar parts are designated by like reference characters are used before without repeating their detailed description. An essential distinction in the operation of the present embodiment over the operation of the embodiment shown in FIGS. 3 to 9 will now be briefly described.

When the wide select button 71 is depressed, the wide switch SW8 is closed, whereby the flipflop formed by the gates G5, G6 is set, providing an "H" level at the output of the gate G6. On the other hand, the flipflop formed by the gates G8, G9 is reset, providing an "L" level at the output of the gate G9. Accordingly, "1" and "0" are supplied to the input ports I10 and I11, respectively. When the narrow select button 73 is depressed, the narrow switch SW9 is closed, whereby the flipflop formed by the gates G5, G6 is reset to provide an "L" level at the output of the gate G6 while the flipflop formed by the gates G8, G9 is set to provide an "H" level at the output of the gate G9. Accordingly, "0" and "1" are supplied to the input ports I10, I11, respectively. Finally, when the normal select button 72 is depressed, the normal switch SW10 is closed, whereby the flipflop formed by the gates G5, G6 and the flipflop formed by the gates G8, G9 are both reset, providing an "L" level at the output of both gates G6 and G9. Accordingly, "0" is supplied to both input ports I10 and I11 of CPU 45.

Figure 10:
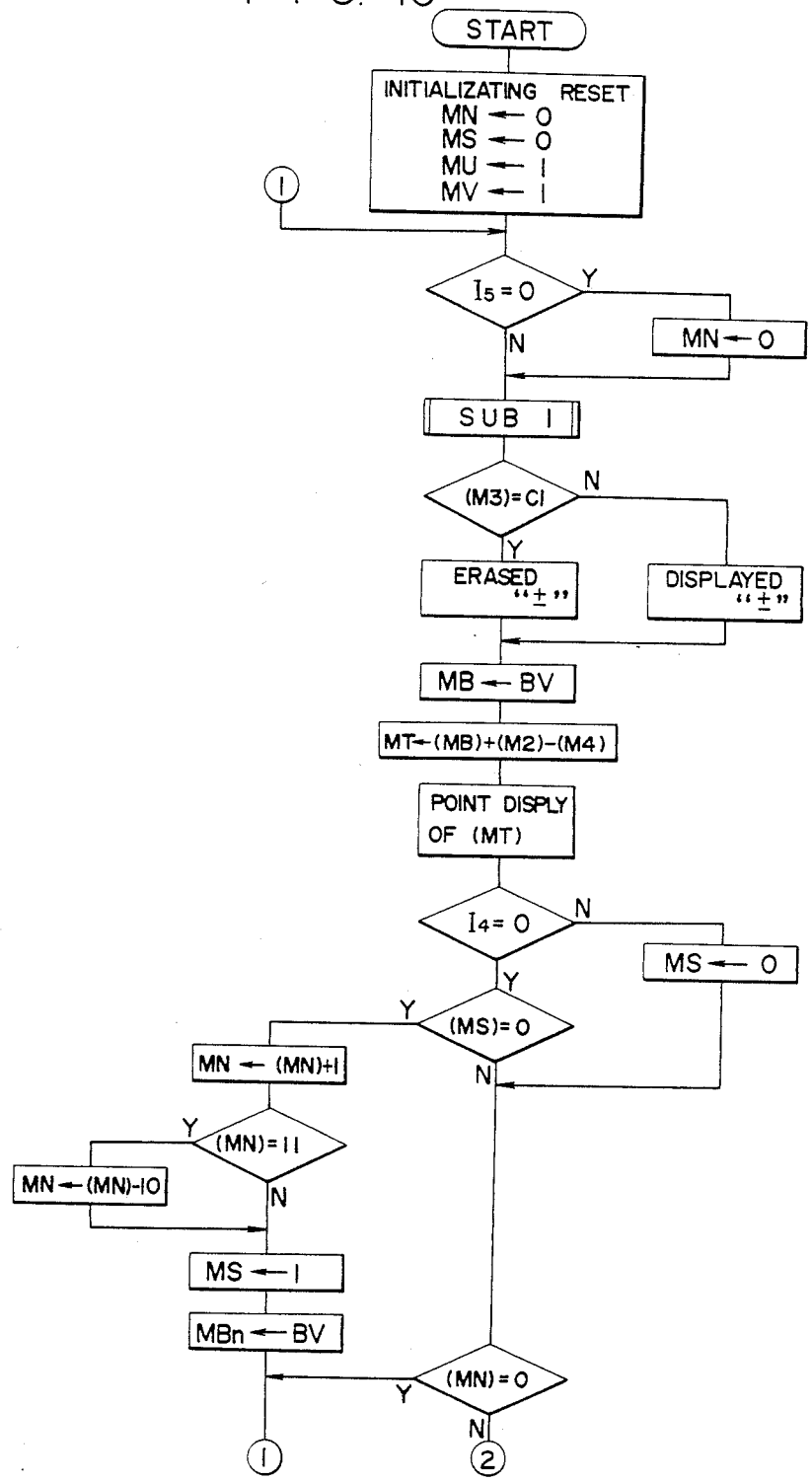
FIGS. 10 to 12 are flowcharts illustrating the operation of the apparatus shown in FIGS. 3 to 9.

The operation of the apparatus for exposure correction according to the preset embodiment can be illustrated by the flowcharts shown in FIGS. 10 to 12 in which the subroutine SUB1 is replaced by a subroutine SUB2 shown in FIG. 16. Accordingly only the subroutine SUB2 will be described.

In the subroutine SUB2, a film speed value SV is stored in the film speed value save memory M2, a correction value CV is stored in the correction value save memory M3, and an aperture value AV is stored in the aperture value save memory M4, in a manner similar to the subroutine SUB1 mentioned in connection with FIG. 13. A decision is then made to see if I10=1 to determine whether or not the wide select button 71 has been depressed. If the button 71 is depressed, indicating that a film having a wide film latitude is used, an exit is made through YES from this decision block. "3" is stored in the highlight correction value save memory MαH and "2⅔" is stored in the shadow correction value save memory MαS, and then the program goes to RETURN.

If the wide select button 71 has not been depressed, and exit is made through NO from the decision block of I10=1, and it is then determined whether or not the narrow select button 73 has been depressed. If the button 73 has been depressed indicating that a film having a narrow latitude is used, an exit is made through YES from this decision block, and "1⅔" is stored in the highlight correction value save memory MαH and "2" is stored in the shadow correction value save memory MαS. The program then goes to RETURN. If the narrow select button 73 has not been depressed as well, an exit is made through NO from this decision block, and since this implies that the normal select button 72 has been depressed for a film having an average latitude, "2" is stored in the highlight correction value save memory MαH and "2⅔" is stored in the shadow correction value save memory MαS. Subsequently the program goes to RETURN.

Since the correction value during the highlight or the shadow referenced photographing operation can be manually established by the depression of either the wide, the normal or the narrow select button 71, 72, 73, respectively, in the apparatus for exposure correction according to the present embodiment, it is possible to permit a free choice of both correction values, by providing dials which establish correction values to be used during the highlight or the shadow referenced photographing operation.

Figure 17:
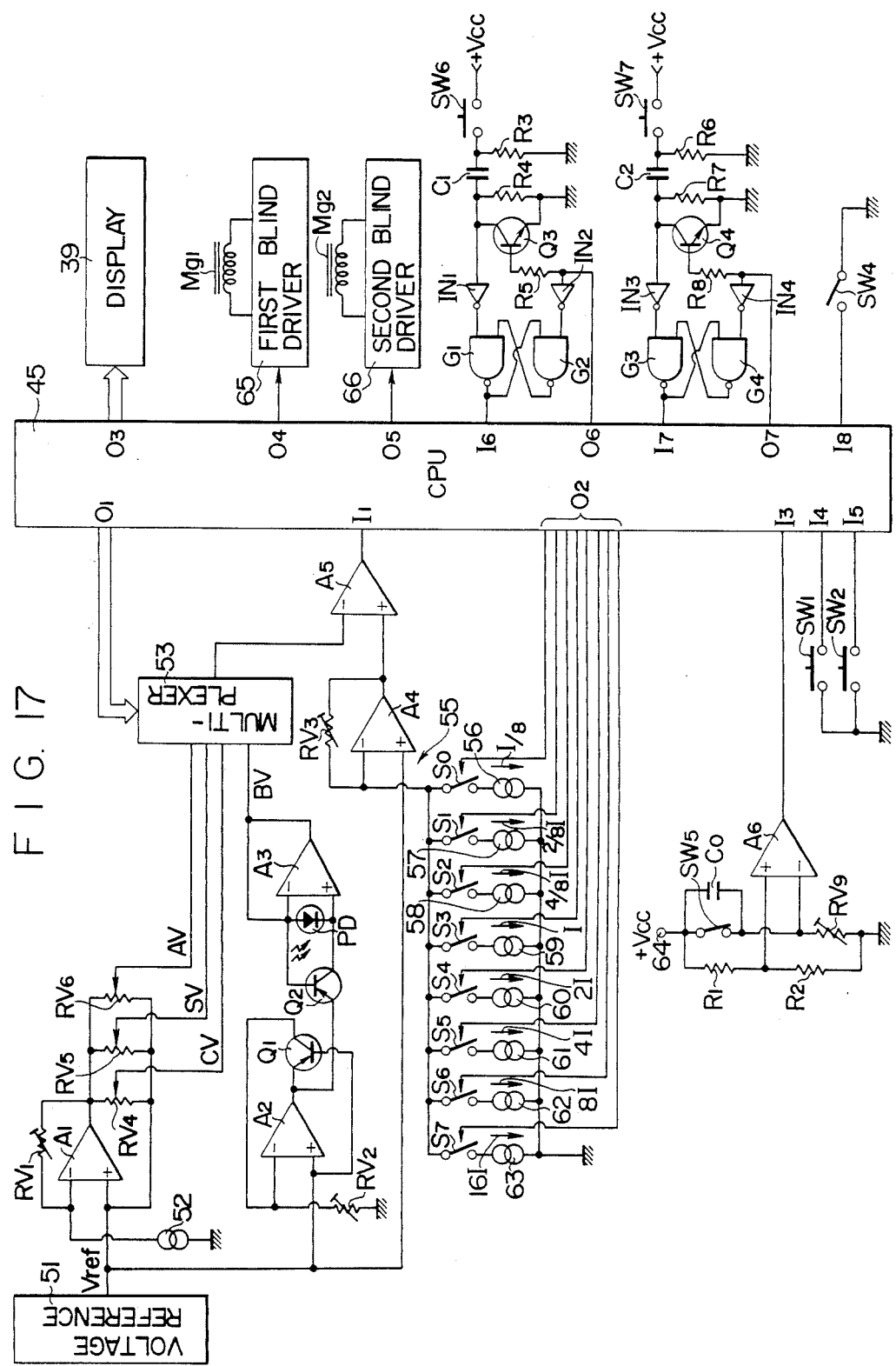
FIG. 17 is a circuit diagram of an apparatus for exposure correction according to a further embodiment of the invention.

FIG. 17 shows a circuit diagram of the electrical circuit of an apparatus for exposure correction according to a further embodiment of the invention. The electrical circuit shown is equivalent to the electrical circuit shown in FIG. 6 from which the film formation reader 44 connected to CPU 45 is removed. Thus, the apparatus of this embodiment is devoid of means which supplies information representing a film latitude. However, it will be appreciated that a film latitude generally has a correlation with a film speed. In the apparatus of this embodiment, such correlation is utilized to determine a correction value to be used during the highlight or the shadow referenced photographing operation automatically. Specifically, a film of a low speed generally has a narrow latitude while a film of high speed has a wide latitude. In a corresponding manner, CPU 45 internally determines the film speed value SV which is supplied through the variable resistor RV5 to determine a correction value automatically.

Automatic determination of the correction value is accomplished with a subroutine SUB3 shown in FIG. 18. Initially, a film speed value SV is stored in the film speed value save memory M2, a correction value CV is stored in the correction value save memory M3 and an aperture value AV is stored in the aperture value save memory M4, in a manner similar to the subroutine SUB1 shown in FIG. 13. A decision is then made to see if (M2)>200, determining if the film speed value SV is greater than ASA 200. If it is, this means that the high speed film has a wide latitude, and accordingly an exit is made through YES from this decision block. "3" is stored in the highlight correction value save memory MαH and "2⅔" is stored in the shadow correction value save memory MαS. The program then goes to RETURN. It will be understood that the number "200" appearing in this decision block is in ASA units, but in actuality, a suitable value which is scaled in units to a film speed value (M2) entered is used. (The same is true for other occurrences in the following description.) If the film speed value SV is not greater than ASA 200, an exit is made through NO from this decision block, and a decision is then made to see if (M2)≦50, determining if the film speed value SV is equal to or less than ASA 50. If the value SV is equal to or less than ASA 50, this represents a low speed film having a narrow latitude, and accordingly an exit is made through YES from this decision block. "1⅔" is stored in the highlight correction value save memory MαH and "2" is stored in the shadow correction value save memory MαH, and the program then goes to RETURN. If it is determined that the film speed value SV is greater than ASA 50, it follows that the film used has a normal film speed and has a film latitude which is intermediate those of a high speed and a low speed film. Accordingly, an exit is made through NO from the decision block of (M2)≦50, and "2" is stored in the highlight correction value save memory MαH and "2⅔" is stored in the shadow correction value save memory MαS. The program then returns.

The remaining operation of the apparatus of the present embodiment can be described by flowcharts shown in FIGS. 10 to 12 in which the subroutine SUB1 is replaced by the subroutine SUB3 shown in FIG. 18. Accordingly, the remainder of the operation of the apparatus will not be described.

What is claimed is:

1. An apparatus for exposure correction for use in a camera of automatic exposure control type, comprising:
   correction means selectively enabled by an operation of a manual operating member for shifting an amount of exposure which is determined on the basis of an output from photometric means by a correction value toward overexposure or underexposure; and
   means for varying the correction value entered by the correction means by operation of the manual operating member as a function of a characteristic of the film, whereby an exposure correction value alters the exposure in accordance with the characteristic of the film, when such a correction is desired.

2. An apparatus according to claim 1 including a photometry initiating means in which the photometric means comprises spotwise photometric means providing an output each time the photometry initiating means is operated, the amount of exposure being determined on the basis of a mean value of the outputs.

3. An apparatus according to claim 1 in which the operating member comprises a pushbutton which selects a highlight referenced photographing mode when depressed, the depression of the pushbutton causing the correction means to shift the amount of exposure by a given correction value toward the undexposure condition.

4. An apparatus according to claim 1 in which the operating member comprises a pushbutton which selects a shadow referenced photographing mode when depressed, the depression of the pushbutton causing the correction means to shift the amount of exposure by a given correction value toward the overexposure condition.

5. An apparatus according to claim 1 in which the varying means comprises means for detecting information representing the film latitude which is given on one of a group of items including a film and a film container, and means for changing a correction value in response to an output from the detecting means, thus automatically changing the correction value.

6. An apparatus according to claim 5 in which the detecting means comprises a plurality of electrical contacts disposed for projection into a patrone chamber of a camera for separate contact with each of a plurality of conductive or non-conductive patterns formed around the peripheral surface of a film patrone, and a film information reader for reading a film latitude information as a result of the conduction or non-conduction between the contacts and the patterns.

7. An apparatus according to claim 1 in which said varying means comprises manual means which allows the correction value to be manually established.

8. An apparatus according to claim 7 in which the manual means is enabled by a depression of a select button which may be selectively depressed in accordance with whether a film used has a wide or a narrow latitude.

9. An apparatus according to claim 1 in which the varying means comprises automatic means which automatically changes the correction value in accordance with film speed information that is supplied through a member of an associated camera which determines the film speed.

10. An apparatus for exposure correction for use in a camera of automatic exposure control type, comprising:
    correction means selectively enabled by a single operation of a manual operating member for shifting an amount of exposure which is determined on the basis of an output from photometric means by a predetermined correction value toward overexposure or underexposure; and
    means for varying the correction value entered by the correction means by operation of the manual operating member as a function of film latitude, whereby an exposure correction value alters the exposure in accordance with the film latitude, when such a correction is desired.

* * * * *

UNITED STATES PATENT AND TRADEMARK OFFICE
CERTIFICATE OF CORRECTION

PATENT NO. : 4,598,986

DATED : July 8, 1986

INVENTOR(S) : Kazutoshi Shiratori, Takashi Kodama, Mitsuo Kawazoe, Tetsuo Miyasaka, Masaki Nagao It is certified that error appears in the above-identified patent and that said Letters Patent is hereby corrected as shown below:

IN THE SPECIFICATION

Column 6, line 45, before "port" insert --output--.

Column 8, line 55, change "$\longrightarrow$" to --$\longleftarrow$--.

line 56, change "MN$\longrightarrow$0" to --MN$\longleftarrow$0--.

line 57, change "M7$\longrightarrow$(M1)" to --M7$\longleftarrow$(M1)--.

Column 10, line 6, change "MT$\longrightarrow$(MB)" to --MT$\longleftarrow$(MB)--.

line 48, change "MN$\longrightarrow$(MN)" to --MN$\longleftarrow$(MN)--.

line 51, change "Nbn" to --MBn--.

Column 11, line 10, change "(NM)" to --(MN)--.

line 18, change "MSn$\longrightarrow$(MBn)" to -- MSn$\longleftarrow$(MBn)--.

line 49, change "M8$\longrightarrow$MIN(MBn)" to --M8$\longleftarrow$MIN(MBn)--.

line 54, change "M7$\longrightarrow$(M8)" to --M7$\longleftarrow$(M8)

Column 12, line 26, change "M8$\longrightarrow$MAX(MBn) to --M8$\longleftarrow$MAX(MBn)--.

UNITED STATES PATENT AND TRADEMARK OFFICE
CERTIFICATE OF CORRECTION

PATENT NO. : 4,598,986          Page 2 of 2

DATED : July 8, 1986

INVENTOR(S) : Kazutoshi Shiratori, Takashi Kodama, Mitsuo Kawazoe, Tetsuo Miyadaka, Masaki Nagao It is certified that error appears in the above-identified patent and that said Letters Patent is hereby corrected as shown below:

line 31, change "M7⟶(M8)"
to --M7⟵(M8)--.

Column 13, line 6, change "M7 ⟶ ".
to --M7 ⟵ --.

Column 14, line 46, change "are" to --as--.

Column 15, line 57, change "formation" to --information--.

Column 16, line 33, change "M$\alpha$H," to --M$\alpha$S,--.

Signed and Sealed this

Twenty-fourth Day of November, 1987

Attest:

DONALD J. QUIGG

Attesting Officer      Commissioner of Patents and Trademarks